United States Patent
Hecht et al.

(10) Patent No.: US 6,845,660 B2
(45) Date of Patent: Jan. 25, 2005

(54) SENSOR CHIP WITH ADDITIONAL HEATING ELEMENT, METHOD FOR PREVENTING A SENSOR CHIP FROM BEING SOILED, AND USE OF AN ADDITIONAL HEATING ELEMENT ON A SENSOR CHIP

(75) Inventors: Hans Hecht, Korntal-Münchingen (DE); Uwe Konzelmann, Asperg (DE); Torsten Schulz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/276,183

(22) PCT Filed: Mar. 13, 2002

(86) PCT No.: PCT/DE02/00894

§ 371 (c)(1),
(2), (4) Date: Apr. 9, 2003

(87) PCT Pub. No.: WO02/073140

PCT Pub. Date: Sep. 19, 2002

(65) Prior Publication Data

US 2003/0154807 A1 Aug. 21, 2003

(30) Foreign Application Priority Data

Mar. 13, 2001 (DE) .......................................... 101 11 840

(51) Int. Cl.⁷ ................................................. G01F 1/68
(52) U.S. Cl. ................................................. 73/204.17
(58) Field of Search .......................... 73/202.5, 204.11, 73/204.13, 204.14, 204.16–204.19, 204.23–204.27, 22.5

(56) References Cited

U.S. PATENT DOCUMENTS

| 4,294,114 A | 10/1981 | Lauterbach |
| 4,468,963 A | 9/1984 | Schauble |
| 4,833,912 A | 5/1989 | Ohta et al. |
| 4,888,988 A | 12/1989 | Lee et al. |
| 5,404,753 A | 4/1995 | Hecht et al. |
| 5,705,745 A | 1/1998 | Treutler et al. |
| 6,182,509 B1 * | 2/2001 | Leung ..................... 73/514.05 |

FOREIGN PATENT DOCUMENTS

| DE | 2 900 210 | 10/1981 |
| DE | 3 135 793 | 9/1984 |
| DE | 36 06 853 | 9/1987 |
| DE | 39 15 871 | 11/1990 |
| DE | 4 219 454 | 4/1995 |
| DE | 196 01 791 | 7/1997 |
| DE | 198 01 484 | 4/2001 |
| GB | 2 348 007 | 9/2000 |
| WO | WO 97 49998 | 12/1997 |
| WO | WO 98 36247 | 8/1998 |

* cited by examiner

Primary Examiner—Edward Lefkowitz
Assistant Examiner—Corey D. Mack
(74) Attorney, Agent, or Firm—Kenyon & Kenyon

(57) ABSTRACT

A sensor chip exposed to a flowing medium is provided with an additional heater situated upstream and at a definite distance from the sensor area, resulting in the impurities in the flowing medium being deposited in the area of the additional heater, and in the impurities being unable to reach the sensor area.

22 Claims, 4 Drawing Sheets

SENSOR CHIP WITH ADDITIONAL HEATING ELEMENT, METHOD FOR PREVENTING A SENSOR CHIP FROM BEING SOILED, AND USE OF AN ADDITIONAL HEATING ELEMENT ON A SENSOR CHIP

CROSS REFERENCE TO RELATED APPLICATIONS

This case is a 371 of PCT/DE02/00894 filed on Mar. 13, 2002.

FIELD OF THE INVENTION

The present invention is directed to a sensor chip, use of an additional heater on a sensor chip, and a method of preventing contamination on a sensor chip.

BACKGROUND INFORMATION

German Patent Application 196 01 791 describes a sensor chip having a sensor area composed of a frame element, a recess, and a membrane, for example. An unwanted influence on the measuring signal of the sensor chip in the sensor area may occur repeatedly due to contamination, e.g., oil, to which the sensor chip is exposed. Contamination with oil in the sensor area or in the immediate area around the sensor area alters the thermal conductivity at the surface of the sensor chip and thus affects the measuring signal. In addition, oil deposited on the sensor chip forms an adhesive for particles contained in a flowing medium. These trapped particles further increase the unfavorable effect.

U.S. Pat. No. 5,705,745 describes a sensor chip having a membrane on which are arranged temperature resistors and heating resistors, the membrane being surrounded by a thermally conductive element, which may also be U-shaped. The thermally conductive element is not heated. The thermally conductive element is also situated at least partially in the area of the membrane.

U.S. Pat. No. 4,888,988 describes a sensor chip having a membrane, a metallic conductor being situated around the is the common grounded neutral conductor of the measuring arrangement on the sensor chip. The cross section of this grounded neutral conductor has even been increased selectively to prevent an increase in temperature. An elevated temperature of the grounded neutral conductor would also have an extremely deleterious effect on the measurement according to this method.

German Patent Application 198 01 484 describes a sensor chip having a membrane, electric conductors being situated around the membrane with an electric current flowing through them. These conductors are temperature sensors which are used for the measurement method and/or the measurement procedure.

German Patent Application 2 900 210 and U.S. Pat. No. 4,294,114 describe a sensor chip having a temperature-dependent resistor on a carrier, another resistor directly adjacent to the temperature-dependent resistor also being applied to the carrier.

German Patent Application 4 219 454 and U.S. Pat. No. 5,404,753 describe a sensor chip having a reference temperature sensor at a distance from a sensor area.

German Patent Application 3 135 793 and U.S. Pat. No. 4,468,963 describe a sensor chip having another resistor upstream and/or downstream from the sensor resistor, but the additional resistor influences the measuring signal.

SUMMARY

The sensor chip according to the present invention, the use of an additional heater on a sensor chip according to the present invention, and the method according to the present invention for preventing contamination of a sensor chip, may provide that contamination of the sensor area of the sensor chip is reduced or prevented in a simple way.

An additional heater situated at a distance of up to 1 mm from the membrane may be used, so that the precipitates which are intentionally formed there are far enough away from the sensor area and are unable to influence the measurement response of the sensor area.

The additional heater may be in a U shape in a manner enclosing the sensor area.

DETAILED DESCRIPTION

Figure 1:
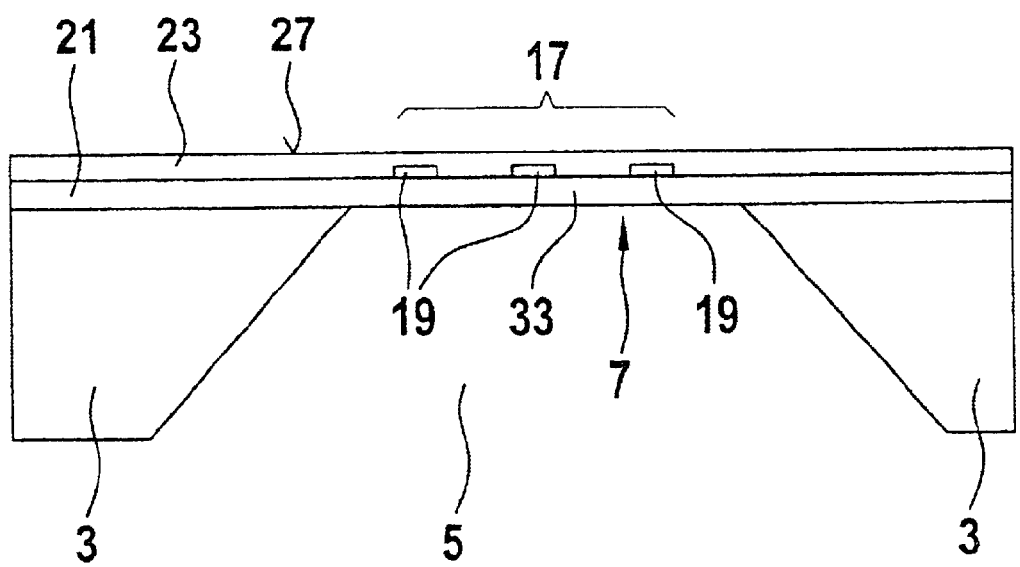
FIG. 1 illustrates an example embodiment of a sensor chip.
Figure 2A:
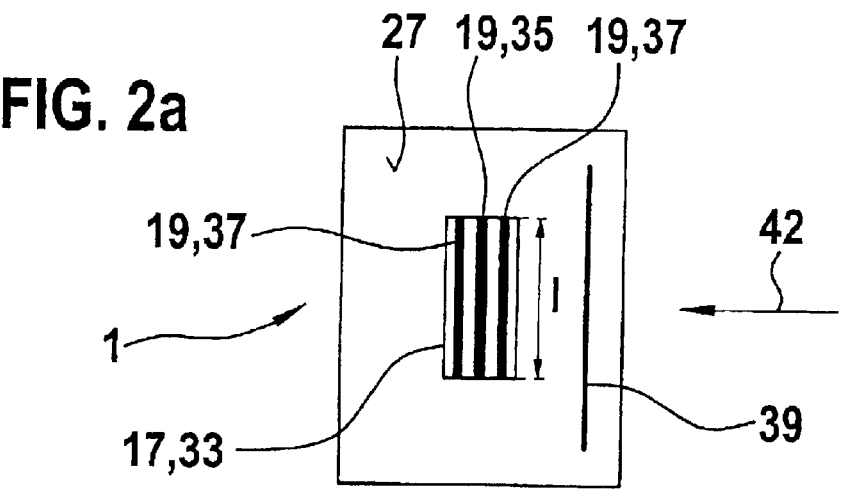
FIG. 2a illustrates a first example embodiment of a sensor chip according to the present invention.
Figure 2B:
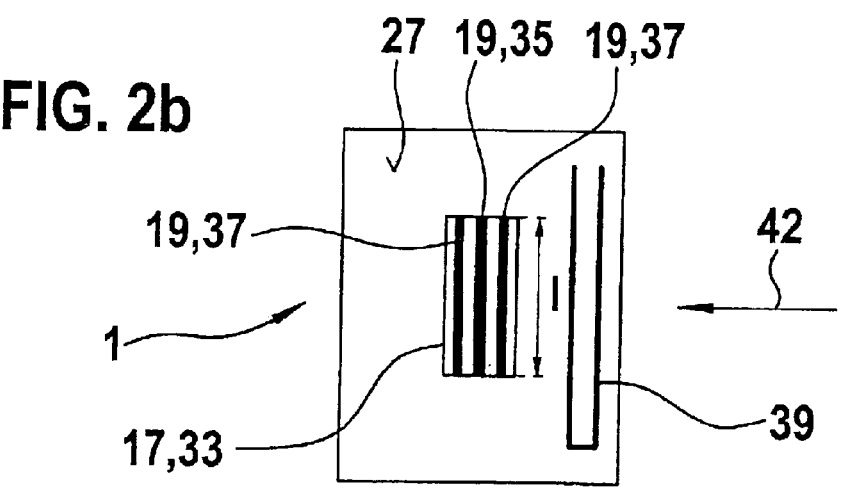
FIG. 2b illustrates a second example embodiment of a sensor chip according to the present invention.
Figure 2C:
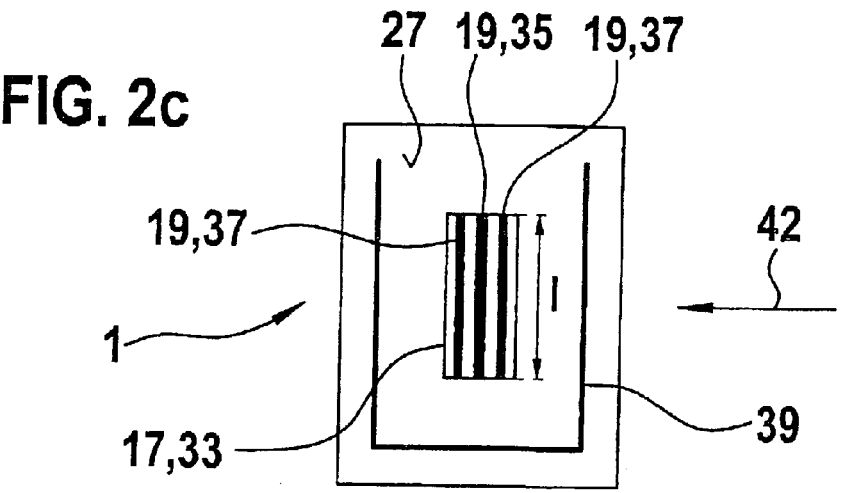
FIG. 2c illustrates a third example embodiment of a sensor chip according to the present invention.

FIG. 1 shows a conventional sensor chip which is improved according to the present invention according to the descriptions of FIGS. 2a through 2c. The production method and the use of such a sensor chip are described in detail in German Patent Application 196 01 791, which is herewith explicitly to be included as part of the present disclosure.

The sensor chip has a frame element 3 made of silicon for example. Frame element 3 has a recess 5. A dielectric layer 21, e.g., made of $SiO_2$' for example, may be applied to the frame element. Layer 21 may extend over entire frame element 3 or only over an area of recess 5. This area forms a membrane area 7 which partially or entirely delimits recess 5 on one side.

At least one, e.g., three metal strips 19 are applied on the side of membrane area 7 facing away from recess 5. Metal strips 19 form electric heaters and/or measuring shunts, for example, forming a sensor area 17 together with membrane area 7. Sensor area 17 may be covered with a protective layer 23. Protective layer 23 may also extend only over metal strips 19.

Membrane area 7 is then formed in part by dielectric layer 21 producing a measuring signal, a membrane 33 and in part by protective layer 21. The sensor chip has a surface 27 which is in direct contact with a flowing medium.

FIG. 2a shows a top view of a first example embodiment of a sensor chip 1 designed according to the present invention. Sensor chip 1 has a sensor area 17 having a length l across a main direction of flow 42. For example, metal strips 19 which form at least one electric heating resistor 35 and at least one temperature sensor 37, for example, are situated in sensor area 17. Temperature sensor 37 is also an electric resistor, for example. In this case there will be one heating resistor 35 and two temperature sensors 37. Metal strips 19 may be mostly situated in sensor area 17 and may be used for a measurement method for determining at least one parameter, e.g., the temperature and flow rate of the flowing medium. Sensor area 17 is therefore connected to a control and regulating circuit. Sensor area 17 may be formed by membrane 33 described above, for example. Sensor chip 1 is situated in a flowing medium for determination of at least one parameter, the flowing medium flowing in the main direction of flow 42, an or over sensor chip 1, i.e., surface 27. The flowing medium may contain impurities which may result in contamination of sensor chip 1. These include, for example, salts dissolved in water or oil. To prevent these impurities from being deposited in the area of sensor area 17, at least partially an additional heater 39 may be situated upstream from sensor area 17, for example, connected to a current source, and heated by its ohmic resistance. Additional heater 39 is situated at a defined distance, e.g., up to 1 mm away from sensor area 17.

No control circuit is necessary to regulate the temperature of additional heater 39. An amperage determined by the design, i.e., by the cross section is sufficient. Additional heater 39 is not used for a measurement method for determining a parameter of the flowing medium, i.e., it is not a component of this measurement zone.

Additional heater 39 may be in the form of a straight line, for example, which extends across, e.g., perpendicular to, the main direction of flow 42, e.g., extending beyond a length l of sensor area 17. Additional heater 39 may also have a spiral shape. Due to additional heater 39, contamination of sensor chip 1 may occur in the area of additional heater 39, but at a definite distance away from sensor area 17 so that the measurement response of sensor area 17 is not affected. This contamination is thus displaced from sensor area 7 into the area around additional heater 39.

The temperature of additional heater 39 may be set so that there is a sharp temperature transition in the area of additional heater 39, so that thermal gradient eddies are produced, more or less filtering the liquid or the oil out of the flowing medium, i.e., the heavier components of the flowing medium are deposited on surface 27 in the area of additional heater 39 but not in sensor area 17.

FIG. 2b shows a top view of another example embodiment of sensor chip 1 according to the present invention. In contrast with FIG. 2a, additional heater 39 is U shaped. The U shape of additional heater 39 may be situated on sensor chip 1 at a definite distance away upstream from sensor area 17, the two legs of the U shape running across main direction of flow 42.

FIG. 2c shows a top view of another example embodiment of a sensor chip 1 according to the present invention. Additional heater 39 may have a U shape which at least partially encloses sensor area 17. Additional heater 39 runs on downstream and upstream sides, for example, definitely at a distance from sensor area 17 and on an end face of membrane 33.

Additional heater 39 may be designed, for example, so that it has a length greater than that of sensor area 17, for example, at least upstream or downstream from sensor area 17. Therefore, sensor area 17 may be protected from contamination over its entire length l.

Resistors 35, 37 and/or additional heater 39 may be designed as printed conductors.

Sensor chip 1 is designed in the form of a chip, for example and has surface 27 past which the flowing medium flows. Sensor area 17 and additional heater 39 are situated together on surface 27.

Figure 3A:
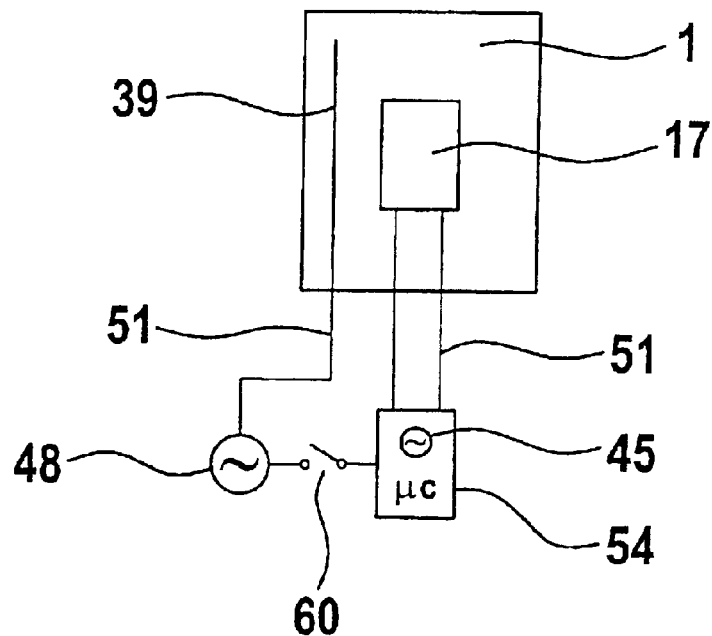
FIG. 3a illustrates an example embodiment of a sensor chip according to the present invention.

FIG. 3a shows an example embodiment of a sensor chip 1 designed according to the present invention, having a sensor area 17 and a first control circuit 54 which is electrically connected to sensor area 17 by electric conductors 51, e.g., bond wires. First control circuit 54 has a first power source 45, e.g., a current or voltage source, or it is connected electrically to such a source by which at least one heating resistor 35 or at least one temperature sensor 37 is heated electrically in sensor area 17.

Additional heater 39 is connected to a separate second power source 48, for example, via electric conductors 51. There is no electric connection between first control circuit 54 and second power source 48. First control circuit 54 thus supplies a measuring signal, e.g., for an engine controller which is independent of operation of additional heater 39, i.e., the operation of additional heater 39 has no effect on the measuring signal. First power source 45 may also heat additional heater 39, e.g., via a voltage splitter, but the control signal of first power source 45 to additional heater 39 may still be independent of the measurement method or signals to sensor area 17.

Sensor chip 1 supplies a measuring signal, e.g., for regulating an internal combustion-engine. Additional heater 39, for example, may be heated only when the engine is not in operation, because after shutdown of the engine may be when the most frequent contamination of sensor chip 1 occurs due to backflow, e.g., from crankcase venting, containing contaminants such as oil. First control circuit 54 may deliver the signal for the heating operation of additional heater 39, for example, by closing a switch 60, for example, so that second power source 48 heats additional heater 39.

Figure 3B:
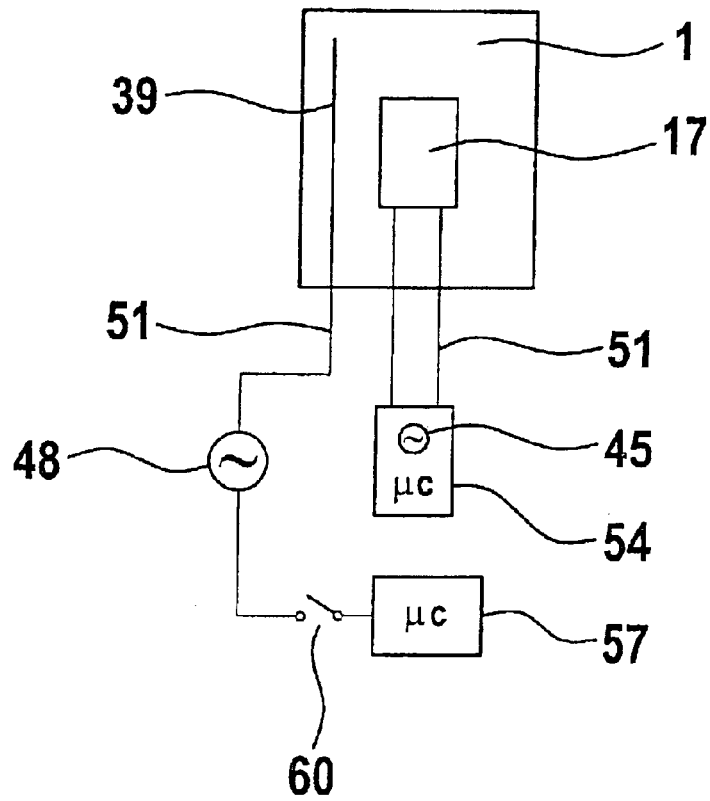
FIG. 3b illustrates an example embodiment of a control circuit according to the present invention.

This control signal for heating additional heater 39 when the engine is not in operation may also be supplied by a second control circuit 57. Second control circuit 57 is the engine regulating unit, for example (FIG. 3b).

Figure 4:
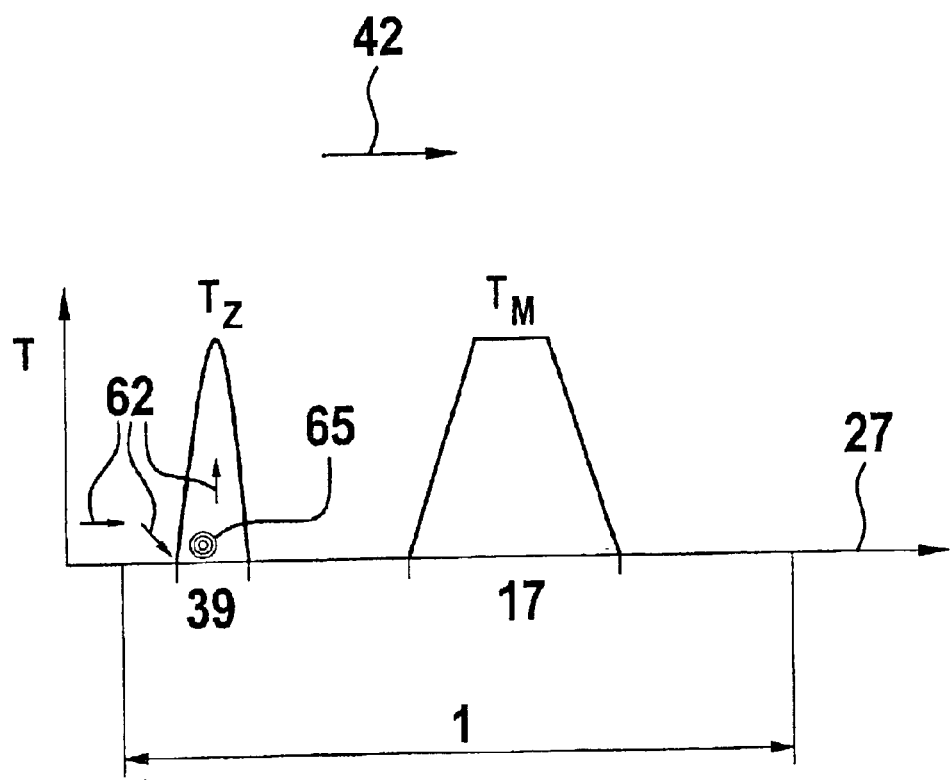
FIG. 4 shows a temperature profile of an additional heater and a sensor area of an example embodiment of a sensor chip according to the present invention.

FIG. 4 shows a temperature profile of an example embodiment of additional heater 39 and sensor area 17. FIG. 4 shows an X/Y diagram, a length in main direction of flow 42 being plotted on the X axis and a temperature on the surface of sensor chip 1 being plotted on the Y axis.

Additional heater 39 is located, for example, upstream from sensor area 17. Between additional heater 39 and sensor area 17 there is a distance which is different from zero. For example, the resistors in sensor area 17 generate a trapezoidal temperature curve having a maximum temperature $T_M$.

Additional heater 39 has a maximum temperature $T_Z$ which varies according to a parabolic curve, for example, which is equal to or greater than temperature $T_M$.

Arrows 62 show the flow pattern of the medium near surface 27. Additional heater 39 creates a more or less abrupt increase in temperature at surface 27, i.e., a thermal gradient which is large and differs from zero. Oncoming particles near surface 27 are more or less sucked by a partial vacuum to surface 27 upstream from or at the initial area of additional heater 39, and then rise upward in the area of the additional heater, i.e., removing themselves from surface 27. Due to this flow pattern, thermal gradient eddies 65 are created in the area of additional heater 39. Particles of dirt or oil therefore adhere to surface 27 of sensor chip 1 in the area of additional heater 39, so that the flowing medium is cleaned in the area near the surface, and sensor area 17 has little or no contamination.

What is claimed is:

1. A sensor chip, comprising:
   a sensor area configured to perform a measurement of at least one parameter of a flowing medium;
   a first heater situated in the sensor area; and an additional heater positioned at a distance from the sensor area;
wherein the sensor area is configured to be operated independently of the additional heater.

2. The sensor chip according to claim 1, wherein at least a portion of the additional heater is positioned upstream of the flowing medium relative to the sensor area.

3. The sensor chip according to claim 2, wherein at least another portion of the additional neater is positioned downstream of the flowing medium relative to the sensor area.

4. The sensor chip according to claim 2, wherein the sensor area has a length extending across a direction of flow of the flowing medium, and wherein the additional heater is disposed across the direction of flow of the flowing medium and is longer than the length of the sensor area.

5. The sensor chip according to claim 2, wherein the additional heater is configured as a printed conductor.

6. The sensor chip according to claim 1, wherein the additional heater is configured to form thermal gradient eddies in the flowing medium in an area of the additional heater, and wherein the additional heater is positioned at a distance from the sensor area.

7. The sensor chip according to claim 6, wherein at least a portion of the additional heater is positioned upstream of the flowing medium relative to the sensor area.

8. The sensor chip according to claim 1, wherein at least a portion of the additional heater is disposed at a distance of up to 1 mm away from the sensor area.

9. The sensor chip as according to claim 1, wherein the additional heater is configured to be U-shaped.

10. The sensor chip according to claim 9, wherein the U-shape of the additional heater is configured to at least partially enclose the sensor area.

11. The sensor chip according to claim 1, wherein the sensor area includes a membrane.

12. The sensor chip according to claim 1, further comprising:
at least one temperature sensor disposed at least partially in a vicinity of the sensor area;
wherein the first heater is disposed at least partially in a vicinity of the sensor area.

13. The sensor chip according to claim 12, wherein the at least one temperature sensor and the first heater are configured as printed conductors.

14. The sensor chip according to claim 1, wherein the additional heater is configured as a printed conductor.

15. The sensor chip according to claim 1, wherein the sensor chip includes at least one surface on which the flowing medium flows, and wherein the sensor area and the additional heater are disposed on the at least one surface.

16. A sensor chip, comprising:
a sensor area configured to perform a measurement of at least one parameter of a flowing medium;
a first heater; and
an additional heater positioned at a distance from the sensor area;
wherein the sensor area is configured to be operated independently of the additional heater; and
wherein the sensor area is electrically connected to a first control circuit configured to generate a measuring signal that is independent of the operation of the additional heater.

17. The sensor chip according to claim 16, wherein the first control circuit is configured to control a first energy source, and wherein the additional heater is electrically connected to a second energy source.

18. A method of preventing contamination of a sensor area of a sensor chip, the sensor area including a first heater and being disposed in a path of a flowing medium, comprising:
electrically heating by its ohmic resistance at least one additional heater disposed on the sensor chip at a distance from the sensor area, whereby thermal gradient eddies are formed in an area of the additional heater, and whereby contaminants in the flowing medium are precipitated in the area of the additional heater, away from the sensor area.

19. A method of preventing contamination of a sensor area of a sensor chip including a heater, the sensor chip being disposed in a path of a flowing medium, comprising:
electrically heating at least one additional heater disposed on the sensor chit by its ohmic resistance, whereby thermal gradient eddies are formed in an area of the additional heater, and whereby contaminants in the flowing medium are precipitated in the area of the additional heater, away from the sensor area;
wherein the sensor chip is configured to supply a measuring signal for a control unit of an internal combustion engine, and wherein the additional heater is configured to be heated when the engine is not in operation.

20. The method according to claim 19, wherein a signal for the heating operation of the additional heater is supplied by a control circuit of the sensor chip.

21. The method according to claim 19, wherein a signal for the heating operation of the additional heater is supplied by a control circuit.

22. The method according to claim 21, wherein the control circuit is an engine regulating unit.

* * * * *

UNITED STATES PATENT AND TRADEMARK OFFICE
CERTIFICATE OF CORRECTION

PATENT NO. : 6,845,660 B2
DATED : January 25, 2005
INVENTOR(S) : Hans Hecht et al.

It is certified that error appears in the above-identified patent and that said Letters Patent is hereby corrected as shown below:

Column 1,
Line 38, change "being situated around the is" to -- being situated around the membrane but not in the area of the membrane. This conductor is --.

Column 2,
Line 42, change "made of $S_iO_2^1$" to -- $S_iO_2$ --.

Column 6,
Line 32, change "on the sensor chit" to -- on the sensor chip --.

Signed and Sealed this

Fourth Day of October, 2005

JON W. DUDAS
*Director of the United States Patent and Trademark Office*